(12) United States Patent
Sauer (10) Patent No.: US 7,740,268 B2
(45) Date of Patent: Jun. 22, 2010

(54) AIRBAG FASTENING SYSTEM

(75) Inventor: Frank Sauer, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 6 days.

(21) Appl. No.: 12/216,922

(22) Filed: Jul. 11, 2008

(65) Prior Publication Data

US 2009/0020985 A1    Jan. 22, 2009

Related U.S. Application Data (63) Continuation of application No. PCT/EP2007/000368, filed on Jan. 10, 2007.

(30) Foreign Application Priority Data

Jan. 13, 2006    (DE)    ............... 20 2006 000 843 U (51) Int. Cl.
*B60R 21/20* (2006.01)

(52) U.S. Cl. ............................ 280/728.2; 280/731

(58) Field of Classification Search ............. 280/728.2, 280/731
See application file for complete search history.

(56) References Cited

U.S. PATENT DOCUMENTS

| | | | |
|---|---|---|---|
| 5,560,643 A | 10/1996 | Lang et al. | |
| 5,577,763 A | 11/1996 | Cuevas | |
| 5,584,501 A * | 12/1996 | Walters | 280/728.2 |
| 5,772,241 A | 6/1998 | Heilig | |
| 5,826,913 A | 10/1998 | Mramor | |
| 5,836,608 A * | 11/1998 | Soderquist et al. | 280/728.2 |
| 5,857,697 A * | 1/1999 | Heilig | 280/731 |
| 5,860,672 A | 1/1999 | Petersen | |
| 5,931,491 A | 8/1999 | Bosgeiter et al. | |
| 6,059,066 A * | 5/2000 | Lary | 180/268 |
| 6,784,803 B1 * | 8/2004 | Hypke et al. | 340/687 |
| 6,814,369 B2 * | 11/2004 | Heindl | 280/728.2 |
| 2005/0104336 A1 | 5/2005 | Schneider et al. | |
| 2006/0202542 A1 * | 9/2006 | Pribonic | 297/467 |
| 2006/0267320 A1 | 11/2006 | Lube | |
| 2007/0108752 A1 | 5/2007 | Eckert et al. | |
| 2007/0267850 A1 * | 11/2007 | Eckert et al. | 280/728.2 |

FOREIGN PATENT DOCUMENTS

| | | |
|---|---|---|
| DE | 203 17 611 | 5/1996 |
| DE | 295 19 700 U1 | 5/1996 |

(Continued)

*Primary Examiner*—Paul N Dickson
*Assistant Examiner*—Drew Brown
(74) *Attorney, Agent, or Firm*—Foley & Lardner LLP (57) ABSTRACT

An airbag fastening system in an airbag module has a clamping connection and includes a retaining ring for an injection orifice of the airbag in an airbag receptacle surrounding both the airbag module and the retaining ring. The retaining ring has a reducing width on an outer face in a main pulling direction when the airbag unfolds. At least a portion of the airbag receptacle or a component associated with the airbag receptacle has a smaller width above the retaining ring than a greatest width of the retaining ring. A lower end of the airbag forms the injection orifice, is folded over the retaining ring, and extends between the retaining ring and the airbag receptacle or the component. The retaining ring includes at least one portion having a conically tapered cross-section on the outer face in the main pulling direction when the airbag unfolds.

12 Claims, 6 Drawing Sheets

FOREIGN PATENT DOCUMENTS

| | | |
|---|---|---|
| DE | 297 15 738 | 2/1998 |
| DE | 103 61 887 A1 | 7/2005 |
| DE | 20 2005 009 002 U1 | 9/2005 |
| DE | 20 2005 010 864 U1 | 10/2005 |
| EP | 0 744 323 A1 | 11/1996 |
| EP | 0 779 186 A2 | 6/1997 |
| EP | 0 802 089 A1 | 10/1997 |
| JP | 06 001189 A | 1/1994 |

* cited by examiner

AIRBAG FASTENING SYSTEM

CROSS-REFERENCE TO RELATED APPLICATION

This application is a Continuation of International Patent Application No. PCT/EP2007/000368, filed Jan. 10, 2007, which was published in German as WO 2007/082723. The foregoing international application is incorporated herein by reference in its entirety.

BACKGROUND

The present disclosure relates generally to the field of an airbag fastening system in an airbag module having a clamping connection. More specifically, the disclosure relates to a fastening system including a clamp for an injection orifice of an airbag in an airbag module.

SUMMARY

One embodiment of the disclosure relates to an airbag fastening system in an airbag module having a clamping connection and including a retaining ring for an injection orifice of the airbag in an airbag receptacle surrounding both the airbag module and the retaining ring. The retaining ring has a reducing width on an outer face in a main pulling direction when the airbag unfolds. At least a portion of the airbag receptacle or a component associated with the airbag receptacle has a smaller width above the retaining ring than a greatest width of the retaining ring. A lower end of the airbag forms the injection orifice, is folded over the retaining ring, and extends between the retaining ring and the airbag receptacle or the component. The retaining ring includes at least one portion having a conically tapered cross-section on the outer face in the main pulling direction when the airbag unfolds. A portion of an inner wall of the airbag receptacle or the component is associated with and extends at least approximately in the same direction as the at least one portion.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

According to various exemplary embodiments, a fastening system including a clamp for an injection orifice of an airbag in an airbag module may be simpler than a conventional fastening system.

According to an exemplary embodiment, an airbag fastening system using a clamping connection may be similar to the airbag fastening system disclosed in U.S. Pat. No. 5,931,491, which is herein incorporated by reference in its entirety. The injection orifice of the airbag extends between the lower edge of the gas generator and the lower edge of the airbag housing. Furthermore, the injection orifice is clamped between the components using a clamp that externally encompasses the airbag housing. In order to achiever a sufficient clamping effect, the ends of the clamps are screwed to one another.

According to another exemplary embodiment, an airbag fastening system using a clamping ring may be similar to the airbag fastening system disclosed in U.S. Pat. No. 5,826,913, which is herein incorporated by reference in its entirety. The airbag fastening system includes a retaining ring on the edge of the injection orifice of the airbag. The edge of the injection orifice encloses the retaining ring, which is pressed by a clamping ring against a mounting plate, fixing the edge of the airbag. The clamping ring may have a generally complex shape resulting in a generally complex manufacturing process.

According to another exemplary embodiment, an airbag module including a retaining ring with a generally circular cross-section may be sewn into the edge of the injection orifice as disclosed in U.S. Pat. No. 5,577,763, which is herein incorporated by reference in its entirety. After assembly of the airbag, the retaining ring is clamped between a carrier plate and a clamping ring that is partially adapted to or has a similar cross-section as the retaining ring. The clamping ring and the mounting plate may have a generally complex shape, which may result in a generally complex manufacturing process.

According to some exemplary embodiments, an airbag fastening system in an airbag module may use a clamping connection. The airbag module may include a retaining ring for an injection orifice of the airbag in an airbag receptacle surrounding both the airbag module and the retaining ring. The retaining ring may have a reduced width on an outer face in the main pulling direction that occurs when the airbag unfolds. The construction of the airbag receptacle and/or an associated component may include a smaller width above the retaining ring than a greatest width of the retaining ring. The lower end of the airbag that may form the injection orifice may be folded over the retaining ring and may extend between the retaining ring and the airbag receptacle or an associated component.

Due to the cross-sectional shape of the retaining ring, the airbag receptacle may be used for the clamping connection. Therefore, an additional clamping ring arranged independently of the airbag receptacle is not required. Additionally, the greater the tensile force of the unfolding airbag, the greater the resulting pressure on the clamped airbag, creating a self-locking connection of the airbag.

According to an exemplary embodiment, the retaining ring includes at least one portion with a conically tapered cross-section in a main pulling direction when the airbag unfolds. A portion of the inner wall of the airbag receptacle or a component extending in the same direction may be associated with the portion having a conically tapered cross-section. Therefore, the retaining ring may include a decreasing external diameter and/or a decreasing width in the main pulling direction. Furthermore, the portion of the inner wall extending in the same direction may include a decreasing width in the main pulling direction.

According to an exemplary embodiment, the airbag fastening system may include a retaining ring. The retaining ring may include at least one curved portion on its outer face. According to further exemplary embodiments, the retaining ring may include a circular or oval cross-section. The retaining ring may be of a circular configuration. The retaining ring may also be of rectangular or oval configuration.

Alternate exemplary embodiments may be used to simplify the introduction of the retaining ring into the airbag receptacle. According to an exemplary embodiment, the portion of the airbag receptacle associated with the retaining ring may be configured as at least one separate component that may be inserted with the airbag into the airbag receptacle after introducing the retaining ring. This component may be latched to the airbag receptacle.

The inserted component may be constructed as a ring. For fastening in the airbag receptacle, the inserted component may include latching hooks that grooves in the airbag receptacle may be associated. The latching hooks may be configured both as separate hooks spaced apart from one another and/or in an annular manner.

According to an exemplary embodiment, the airbag receptacle for the insertion of the retaining ring may include an opening on one side that may be closed by a cover. The inner wall of the cover may include the same path as the opposing wall of the airbag receptacle. Therefore, the airbag receptacle in the region above the retaining ring may also include a smaller width than the greatest width of the retaining ring.

When using a circular retaining ring, the airbag receptacle and the retaining ring may include portions that allow the fastening of the retaining ring in the airbag receptacle in the manner of a bayonet closure. In this connection, the retaining ring may be inserted into the airbag receptacle with the folded-over end of the airbag. The retaining ring may be rotated such that portions of the retaining ring may engage portions of the airbag receptacle.

Furthermore, it is advantageous that the injection orifice of the airbag may be of tubular configuration. According to various exemplary embodiments, the fastening system may be used advantageously with evacuated airbag packets.

Figure 1:
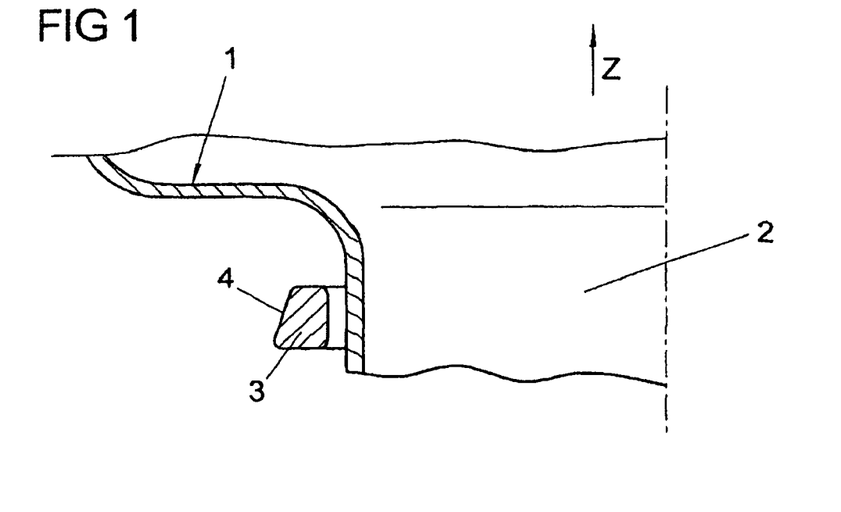
FIG. 1 is a schematic view of an assembly sequence for an airbag, according to an exemplary embodiment.

Referring to FIG. 1, a portion of an airbag 1 is shown with a tubular injection orifice 2 that a retaining ring 3 is associated with. The retaining ring 3 includes on an outer face a bevel 4 that extends such that the retaining ring includes a reducing width in the main pulling direction Z when the airbag 1 unfolds. During assembly of the airbag, the injection orifice 2 of the airbag 1 is guided through the retaining ring 3, as shown in FIG. 1. Furthermore, the end of the injection orifice may be folded over the retaining ring 3 as shown in FIG. 2.

An airbag receptacle 5 includes a portion 6 that includes an altered width on a side facing the retaining ring in the same direction as the retaining ring 3. Therefore, the bevel 4 of the retaining ring 3 and a bevel 7 on the portion 6 of the airbag receptacle 5 extend approximately parallel to one another.

Figure 2:
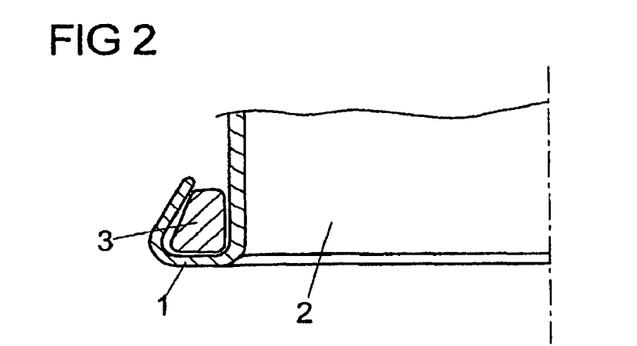
FIG. 2 is a schematic view of an assembly sequence for an airbag, according to another exemplary embodiment.
Figure 3:
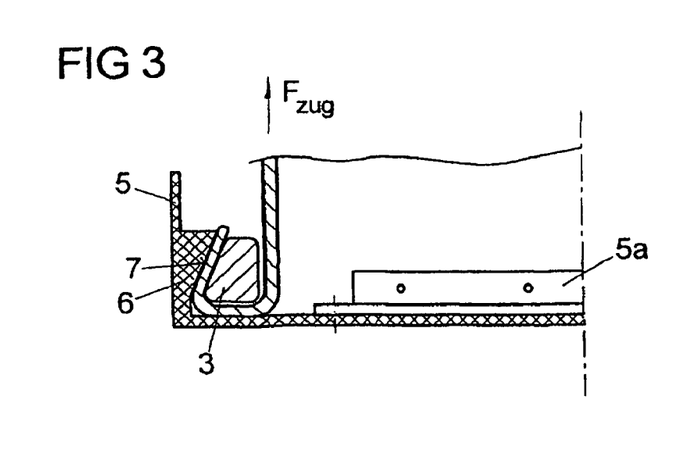
FIG. 3 is a schematic view of an assembly sequence for an airbag, according to a further exemplary embodiment.

The fastening of the airbag 1 in the airbag receptacle occurs by pressing the retaining ring with the folded-over end of the injection orifice 2, as shown in FIG. 2. The retaining ring may be pressed into the region of the portion 6 such that the retaining ring may reach an end position as shown in FIG. 3. Thus, a gas generator 5a may be arranged in the position shown in FIG. 3.

When the airbag 1 is unfolded, the retaining ring 3 presses the portion 6 as a result of the tensile force Fzug, clamping the end of the injection orifice 2. As the tensile force Fzug increases, the pressure on the clamped end of the injection orifice also increases, allowing the connection to operate in a self-locking manner.

Figure 4:
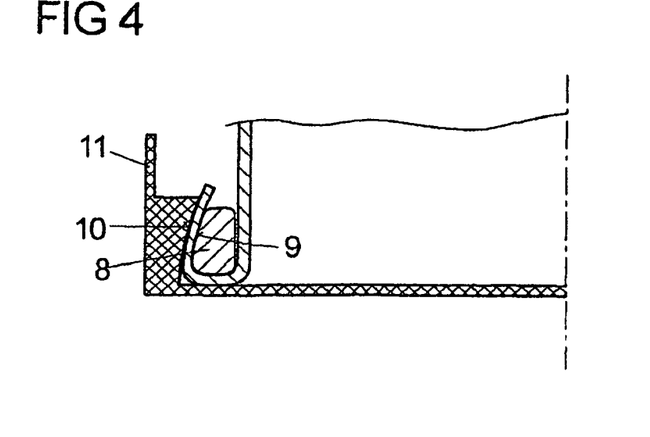
FIG. 4 is schematic view of an airbag, according to an exemplary embodiment.

Furthermore, retaining rings including a cross-sectional shape different from those shown in FIGS. 1 to 3 may be used. In FIG. 4 a retaining ring 8 includes a curved portion 9 on an outer face. A concave curved portion 10 on an airbag receptacle 11 is associated with the curved portion extending in a convex manner.

Figure 5:
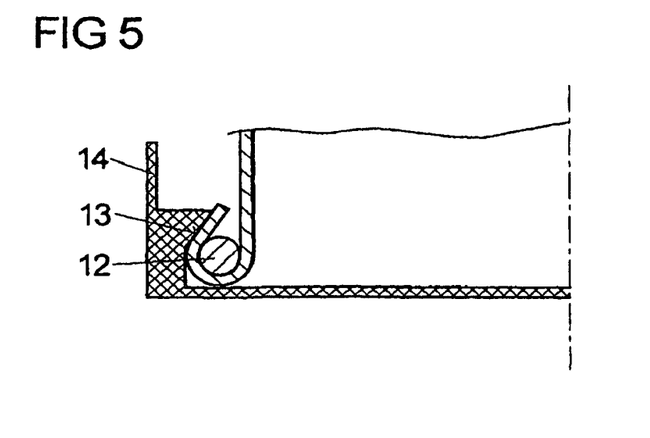
FIG. 5 is schematic view of an airbag, according to a another exemplary embodiment.

According to FIG. 5, a retaining ring 12 has a circular cross-section. A concave curved portion 13 on an airbag receptacle 14 is associated with the retaining ring 12.

Figure 6:
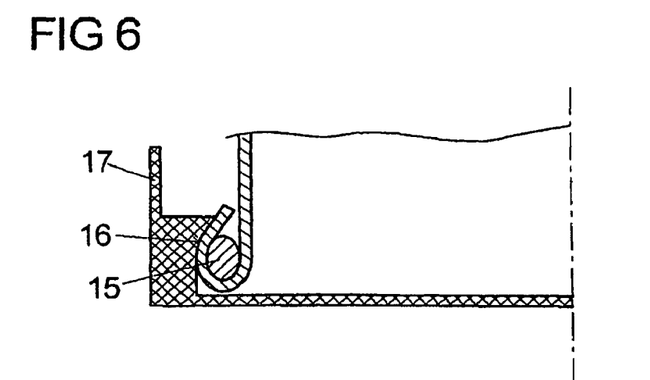
FIG. 6 is schematic view of an airbag, according to a further exemplary embodiment.

According to FIG. 6, a retaining ring 15 includes an oval cross-section. A concave curved portion 16 on an airbag receptacle 17 is also associated with the retaining ring 15.

Figure 7:
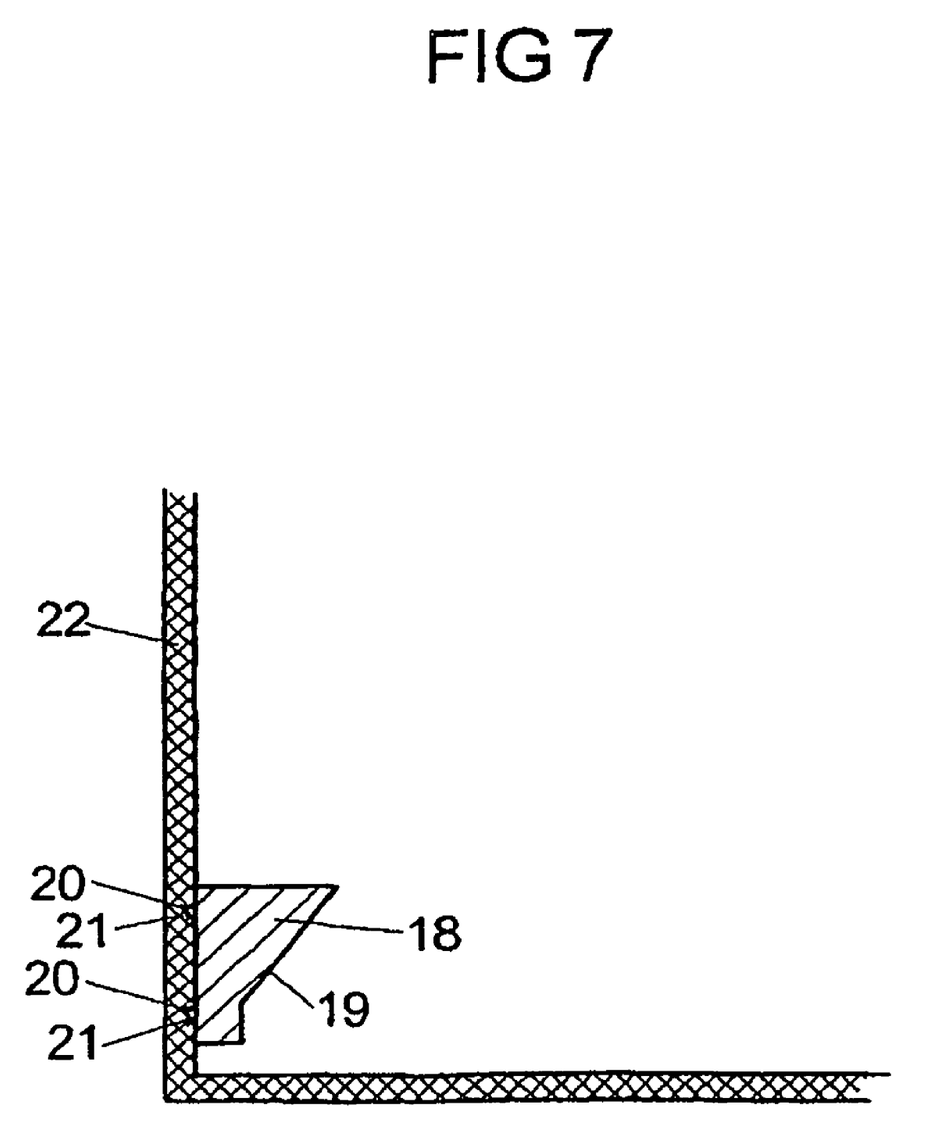
FIG. 7 shows an airbag housing, according to an exemplary embodiment.

According to FIG. 7, a portion associated with the retaining ring is configured as a separate ring 18. The ring also includes a surface associated with the retaining ring that may be configured as a bevel 19. Additionally, the ring 18 includes elastically deformable latching hooks 20 that are associated with grooves 21 in the airbag receptacle 22. The latching hooks are arranged both as individual hooks at specific intervals on the ring 18 and/or arranged on the periphery in an annular manner.

The assembly of the airbag is similar to the assembly shown in FIGS. 1 and 2, for example the retaining ring may be pressed with the folded-over end of the injection orifice into the airbag receptacle 22 as far as the region of the grooves 21. Furthermore, the ring 18 is inserted into the airbag receptacle 22. As a result, the latching hooks 20 engage in the grooves 21 to position the retaining ring. Therefore, the airbag may be clamped between the retaining ring and the ring 18.

Figure 8:
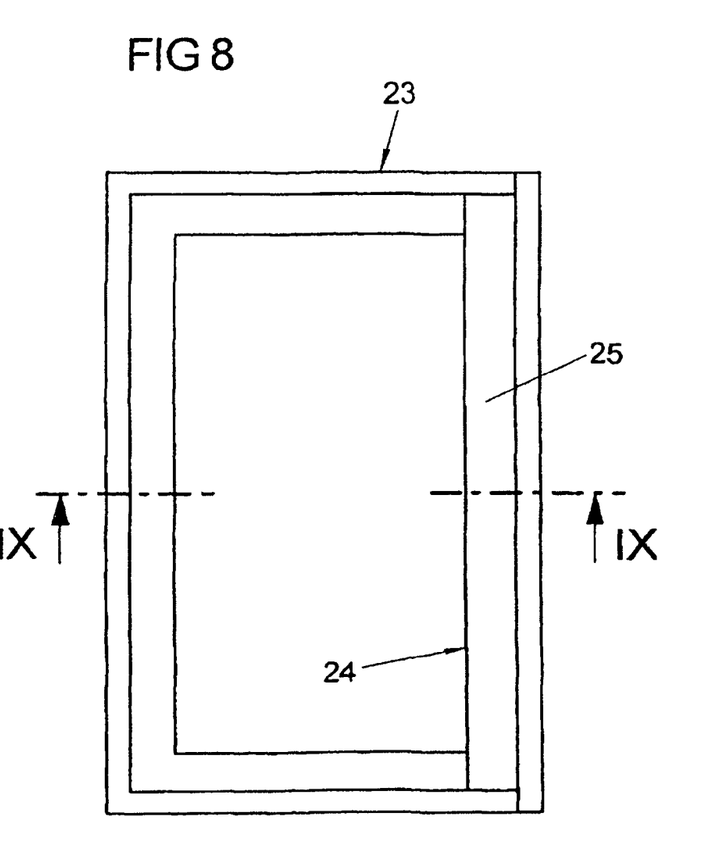
FIG. 8 shows an airbag receptacle according to an exemplary embodiment.
Figure 9:
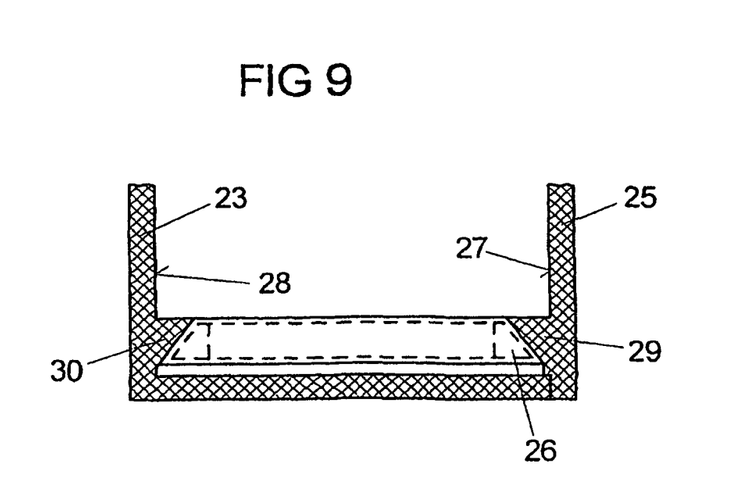
FIG. 9 shows a cross-sectional view of an airbag receptacle, according to an exemplary embodiment.

Referring to FIG. 8, an airbag receptacle 23 for a passenger airbag includes an opening 24 that may be closed by a cover 25. The retaining ring 26, shown by dashed lines in FIG. 9, may be rectangular. The retaining ring 26 is inserted with the folded-over end of the airbag through an opening 24 into the airbag receptacle 23. Subsequently, the cover is positioned such that the airbag receptacle 23 may close at the side, as shown in FIGS. 8 and 9. The cover may be fastened to the airbag receptacle by screws or by a latching connection. As shown in FIG. 9, the inner wall 27 of the cover 25 includes the same path as the opposing inner wall 28 of the airbag housing, for example the cover includes a portion 29 extending obliquely into the airbag receptacle that opposes the portion 30 of the airbag receptacle 23 extending obliquely into the airbag receptacle. Therefore, the retaining ring 26 may be retained by the conical cross-section in the airbag receptacle 23.

Figure 10:
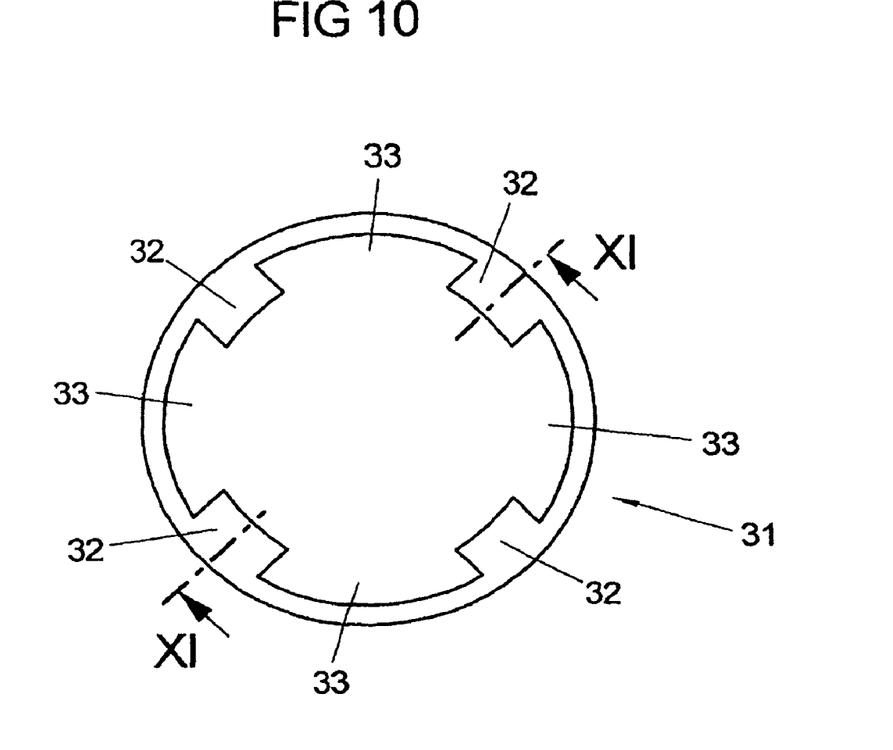
FIG. 10 shows a schematic view of an airbag receptacle for a driver airbag, according to an exemplary embodiment.
Figure 11:
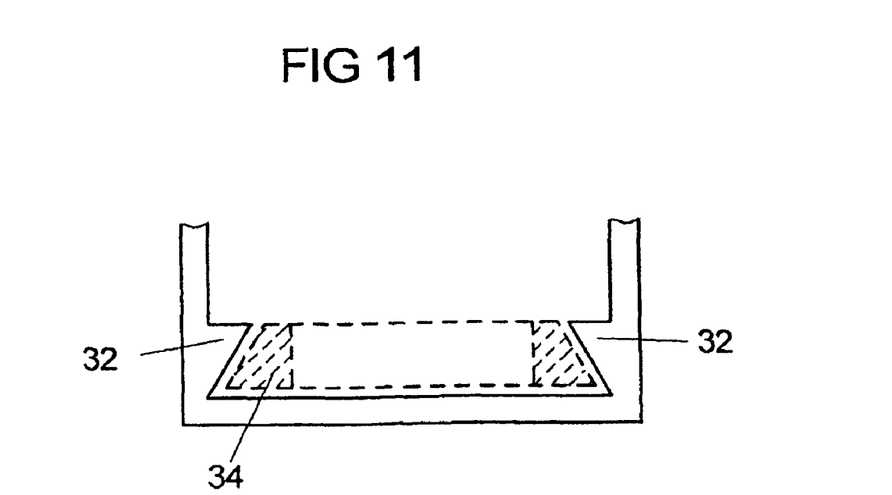
FIG. 11 shows a cross-sectional view of an airbag receptacle for a driver airbag, according to an exemplary embodiment.
Figure 12:
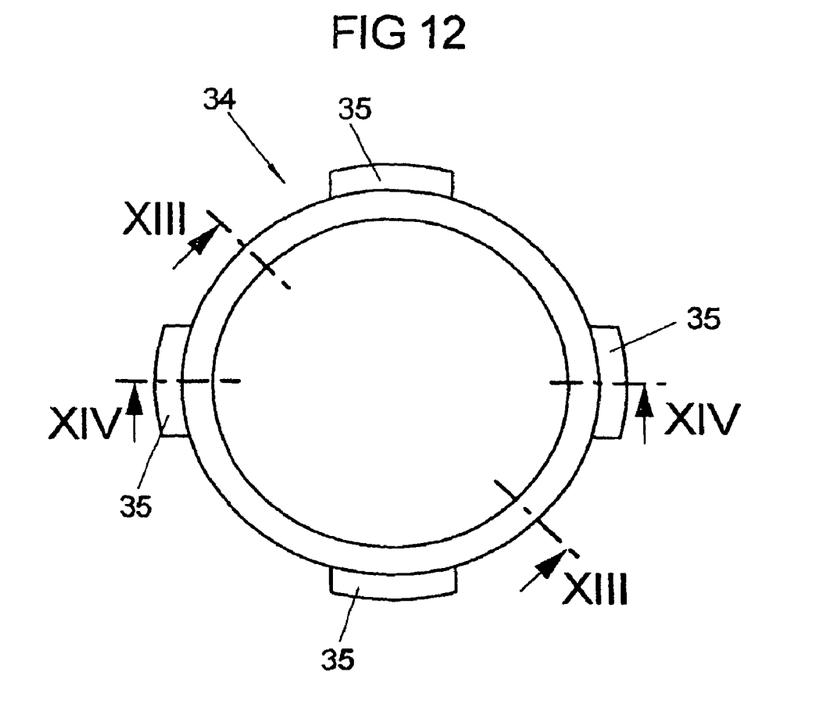
FIG. 12 shows a schematic view of a retaining ring for an airbag receptacle according to an exemplary embodiment.

Referring to FIGS. 10 and 11, an airbag receptacle 31 for a driver airbag is shown. The airbag receptacle includes portions 32 that extend obliquely. The portions 32 are arranged spaced apart from one another, such that intermediate spaces 33 are present. Furthermore, in the intermediate spaces 33 the inner wall of the airbag receptacle 31 extends parallel to the outer walls. A retaining ring 34 is associated with the airbag receptacle 31 that includes portions 35 spaced apart from one another.

Figure 13:
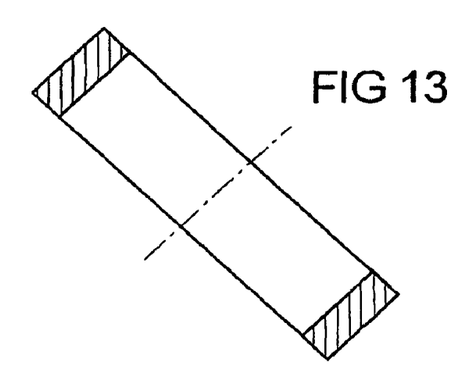
FIG. 13 shows a cross-sectional view of a retaining ring, according to an exemplary embodiment.
Figure 14:
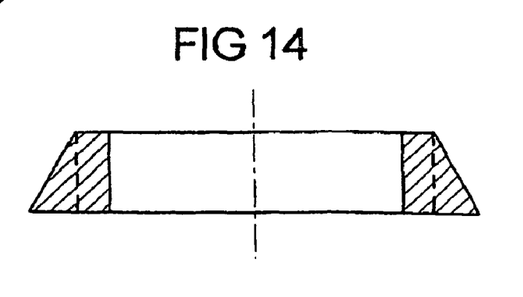
FIG. 14 shows a cross-sectional view of a retaining ring, according to an exemplary embodiment.

The portions 35 may include the radial width of the portions 32 of the airbag receptacle 31 and include a tapered cross-sectional path from bottom to top, as shown in FIG. 14. Between the portions 35, the outer wall of the retaining ring 34 may extend parallel to the inner wall, as shown in FIG. 13.

According to an exemplary embodiment, the retaining ring 34 may be inserted into the airbag receptacle 31 such that the portions 35 may be located in the intermediate spaces 33. Subsequently, the retaining ring 34 is rotated until the portions 35 are located in the region of the portions 32, as shown in FIG. 11. Thus, the airbag in the region of the portions 32, 35 may be fastened by clamping similar to the preceding exemplary embodiments.

The priority application, German Patent Application No. 20 2006 000 843.8 filed Jan. 13, 2006, including the specification, drawings, claims and abstract, is incorporated herein by reference in its entirety.

Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application. The scope of the present application is to be defined as set forth in the following claims.

What is claimed is:

1. An airbag fastening system in an airbag module having a clamping connection, the airbag fastening system comprising:
   a retaining ring for an injection orifice of the airbag in an airbag receptacle surrounding both the airbag module and the retaining ring, the retaining ring having a reducing width on an outer face in a main pulling direction when the airbag unfolds, at least a portion of the airbag receptacle or a component associated with the airbag receptacle having a smaller width above the retaining ring than a greatest width of the retaining ring,
   wherein a lower end of the airbag forms the injection orifice, is folded over the retaining ring, and extends between the retaining ring and the airbag receptacle or the component, and
   wherein the retaining ring comprises at least one portion having a conically tapered cross-section on the outer face in the main pulling direction when the airbag unfolds, a portion of an inner wall of the airbag receptacle or the component being associated with and extending at least approximately in the same direction as the at least one portion.

2. The airbag fastening system as claimed in claim 1, wherein the shape of the retaining ring is circular, rectangular, or oval.

3. The airbag fastening system as claimed in claim 2, wherein the retaining ring is circular and the airbag receptacle and retaining ring comprise portions allowing fastening of the retaining ring in the airbag receptacle by a bayonet closure.

4. The airbag fastening system as claimed in claim 1, wherein the component of the airbag receptacle associated with the retaining ring is configured as at least one separate component that may be inserted into the airbag receptacle with the airbag after arranging the retaining ring.

5. The airbag fastening system as claimed in claim 4, wherein the component is latched to the airbag receptacle.

6. The airbag fastening system as claimed in claim 4, wherein the component is configured as a ring.

7. The airbag fastening system as claimed in claim 4, wherein the component comprises latching hooks with which grooves in the airbag receptacle are associated.

8. The airbag fastening system as claimed in claim 7, wherein the latching hooks are configured as separate hooks that are spaced apart from one another.

9. The airbag fastening system as claimed in claim 7, wherein the latching hooks have an annular configuration.

10. The airbag fastening system as claimed in claim 1, wherein the airbag receptacle has an opening on one side that is closed by a cover.

11. The airbag fastening system as claimed in claim 10, wherein an inner wall of the cover has the same path as an opposing wall of the airbag receptacle.

12. The airbag fastening system as claimed in claim 1, wherein the injection orifice of the airbag has a tubular configuration.

* * * * *